United States Patent [19]
Furukawa et al.

[11] Patent Number: 4,951,207
[45] Date of Patent: Aug. 21, 1990

[54] METHOD FOR CONTROLLING THE FRONT WHEEL STEER ANGLE

[75] Inventors: Yoshimi Furukawa; Akihiko Takei; Shinnosuke Ishida; Nobuyuki Oono, all of Saitama, Japan

[73] Assignee: Honda Giken Kogyo Kabushiki Kaisha, Saitama, Japan

[21] Appl. No.: 248,869

[22] Filed: Sep. 23, 1988

[30] Foreign Application Priority Data

Sep. 25, 1987 [JP] Japan ................... 62-240111

[51] Int. Cl.$^5$ .............................. B62D 5/00
[52] U.S. Cl. ..................... 364/424.05; 180/79.1; 180/142
[58] Field of Search ............ 364/424.05, 424.01; 180/140, 142, 148, 132, 79.1; 280/47.34; 303/96

[56] References Cited

U.S. PATENT DOCUMENTS

| | | | |
|---|---|---|---|
| 4,705,130 | 11/1987 | Fukinaga et al. | 180/142 |
| 4,706,771 | 11/1987 | Kawabe et al. | 180/142 |
| 4,706,979 | 11/1987 | Kawabe et al. | 364/424.05 |
| 4,720,790 | 1/1988 | Miki et al. | 180/142 |
| 4,720,791 | 1/1988 | Daido | 180/142 |
| 4,773,012 | 9/1988 | Ito et al. | 364/424.05 |

Primary Examiner—Gary Chin
Attorney, Agent, or Firm—Skjerven, Morrill, MacPherson, Franklin & Friel

[57] ABSTRACT

The method of the present invention improves the damping property of the yaw motion of the vehicle by feeding back a detected yaw rate value in a dynamic sense for compensating the front wheel steer angle so as to increase the damping coefficient of the yaw motion of the vehicle. By controlling the front wheel steer angle by accounting for not only the proportional term of the steering wheel input angle but also the derivative term which is proportional to the steering wheel input angular speed, in the feed-forward control of the front wheel steer angle in relation with the steering operation by the driver, and by appropriately varying the control parameters of the yaw rate feed-back and the steering wheel input feed-forward, the yaw response of the vehicle can be made proportional to the steering wheel input, and the response delay in the yaw rate against the steering wheel input can be reduced to substantially zero.

12 Claims, 3 Drawing Sheets

METHOD FOR CONTROLLING THE FRONT WHEEL STEER ANGLE

TECHNICAL FIELD OF THE INVENTION

The present invention relates to a method for controlling the front wheel steer angle which can improve the driving stability of a vehicle through improvement of the response properties of the vehicle with respect to the steering wheel input angle.

BACKGROUND OF THE INVENTION

As well known, the response property of the yaw rate r (i.e., the behavior of the yaw rate r in relation to the steering wheel input angle or the turning angle of the steering wheel) of a conventional vehicle, whose front wheel steer angle $\delta_f$ is controlled in proportion to the steering wheel input angle $\delta_{sw}$ by the driver, can be expressed by the following transfer function:

$$\mathcal{L}\{r/\delta_{sw}\} = G_1(s) = G_1(O) \times \frac{1 + T_r s}{1 + (2\xi/\omega_n)s + (1/\omega_n^2)s^2} \quad (1)$$

where $$G_1(O) = \frac{1}{n} \times \frac{V_o}{l(1 + K V_o^2)} \quad (2)$$

$$K = \frac{C_r b - C_f a}{C_f C_r l^2} m \quad (3)$$

$$T_r = \frac{am}{C_r l} V_o \quad (4)$$

$$\frac{2\xi}{\omega_n} = \frac{(C_f a^2 + C_r b^2)m + (C_f + C_r)I}{C_f C_r l^2} \times \frac{V_o}{1 + k V_o^2} \quad (5)$$

$$\frac{1}{\omega_n^2} = \frac{Im}{C_f C_r l^2} \times \frac{V_o^2}{1 + K V_o^2} \quad (6)$$

The symbols used here are defined as follows:
£ {}: Laplace transformation
$G_1(s)$ : transfer function of the yaw rate r with respect to the front wheel steer angle $\delta_f$
n : steering gear ratio ($\delta_{sw} = n\delta_f$)
$V_O$: vehicle speed
l: wheel base
K : stability factor
$T_r$: advance time constant of the yaw rate
$\zeta$: damping coefficient
$\omega_n$: natural frequency
$C_f$: front wheel cornering power (combination of right and left wheels)
$C_r$: rear wheel cornering power (combination of right and left wheels)
a : distance between the front axle and the center of gravity
b : distance between the rear axle and the center of gravity
m : mass of the vehicle
I : yaw rate moment of inertia of the vehicle
· Equation (1) disregards the contribution from the rolling motion and assumes that the motion of the vehicle consists of two degrees of freedom of motion or the yawing rotational motion and the lateral parallel motion. However, it is possible to make Equation (1) to be substantially exact in most cases even when the influence from the rolling motion cannot be neglected, by appropriately modifying the coefficients in the various terms of Equations (2) through (6).

From Equations (5) and (6), one can see that the natural frequency $\omega_n$ of the yawing motion of the vehicle becomes lower and the damping coefficient $\zeta$ becomes less as the vehicle speed increases. Therefore, at high speed, the response delay between the steering wheel input by the driver and the onset of the yawing motion of the vehicle becomes so great and the damping of the yawing motion of the vehicle becomes so small that the driver experiences a certain difficulty in steering the vehicle along a prescribed course, and this difficulty increases with the increasing vehicle speed.

BRIEF SUMMARY OF THE INVENTION

In view of such problems of conventional vehicles, a primary object of the present invention is to improve the damping property of the yawing motion of the vehicle.

A second object of the present invention is to eliminate the undesirable time delay between the steering wheel input and the yawing motion of the vehicle.

A third object of the present invention is to improve the damping property of the yawing motion of the vehicle and/or to eliminate the undesirable time delay between the steering wheel input and the yawing motion of the vehicle simply through appropriate control of the front wheel steer angle with respect to the steering wheel input.

These and other objects of the present invention can be accomplished by providing a method for controlling the front wheel steer angle in a front wheel steering system which controls the front wheel steer angle $\delta_f$ as a sum of a steering wheel input angle feed-forward term $f_1(\delta_{sw})$ which is based on the steering wheel input angle $\delta_{sw}$, and a yaw rate feedback term $f_2(r)$ which is based on a detected value of the yaw rate r, or according to the following formula;

$$\delta_f = f_1(\delta_{sw}) + f_2(r) \quad (7)$$

wherein: the transfer function of the yaw rate feedback term $f_2(r)$ with respect to the yaw rate value r is given by $$\mathcal{L}\{f_2(r)/r\} = \frac{T_d s}{1 + T_1 s} \quad (8)$$

(where s is the Laplace variable and £ {} denotes the Laplace transformation).

Thus, by appropriately determining the values of $T_1$ and $T_d$, (which are coefficients which can be determined at will and are adjusted so as to obtain a described vehicle response) the damping ($T_d$) and time delay ($T_1$) properties of the yaw response of the vehicle can be controlled at will. In particular, if $T_1 = T_r$, the damping property may be controlled without affecting the other properties of the yaw response of the vehicle. Further, by controlling the front wheel steer angle by accounting for not only the proportional term of the steering wheel input angle but also the derivative term which is proportional to the steering wheel input angular speed, in the feed-forward control of the front wheel steer angle in relation with the steering operation by the driver, the delay property of the yaw response of the vehicle can be improved.

Since the dynamic yaw response of the vehicle to a given steering wheel input is dependent on the vehicle speed, by varying $T_1$ and $T_d$ according to the vehicle speed $V_O$, a particularly favorable response can be obtained.

According to a preferred embodiment of the present invention, the steering wheel input angle feed-forward term $f_1(\delta_{sw})$ is given as a sum of a proportional term and a derivative term or as $$\pounds \{f_1(\delta_{sw})/\delta_{sw}\}=(1/n)(1+T_2s) \tag{11}$$

where $T_2$ is the differentiation time. Particularly when $$T_2=(1/\omega_n^2)(1/T_r) \tag{12}$$

and $$T_d=\{T_r+T_2-(2\zeta/\omega_n)\}\times\{1/G_1(0)\} \tag{13}$$

the yaw response of the vehicle becomes proportional to the steering wheel input, and there is no delay therebetween.

BRIEF DESCRIPTION OF THE DRAWINGS

Now the present invention is described in terms of specific embodiments in the following with reference to the appended drawings, in which.

DETAILED DESCRIPTION OF THE INVENTION

Description of Control Method I

Increase in the damping coefficient due to yaw rate feed-back

Figure 1:
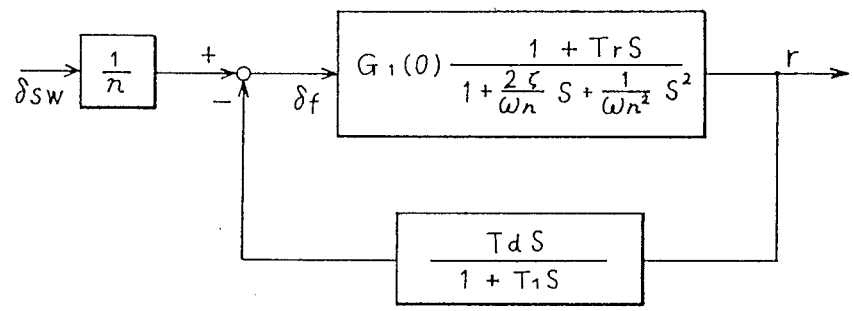
FIGS. 1 through 6 are block diagrams for showing the principle of the method for controlling the front wheel steer angle according to the present invention.

The feed-back control of the yaw rate r is performed by using a wash-out filter as shown in FIG. 1. As is known in the art, a wash-out filter produces an output only as a transient response, and its transfer function may be expressed by $G(s)=Ts/(I+Ts)$. A wash-out filter is essentially a high-pass filter having zero gain. Thus the transfer function of the wash-out filter in FIG. 1 is:

$$T_d s/(1+T_1 s) \tag{14}$$

$$\pounds(\delta_f)=(1/n)\quad(\delta_{sw})+\{T_d s/(1+T_1 s)\}\quad(r) \tag{15}$$

$$\pounds(r) = G_1(O) \times \frac{1 + T_r s}{1 + (2\zeta/\omega_n)s + (1/\omega_n^2)s^2} \times \pounds(\delta_f) \tag{16}$$

By eliminating $\pounds(\delta_f)$ from Equations (15) and (16), $$\pounds(r) = G_1(O) \times \frac{1 + T_r s}{1 + (2\zeta/\omega_n)s + (1/\omega_n^2)s^2} \times$$

$$[(1/n)\pounds(\delta_{sw}) + \{T_d s/(1+T_1 s)\}\quad(r)]$$

$$G_2(s) = (1/n)G_1(O)(1 + T_r s)/[1 + \{(2\zeta/\omega_n) T_d\}s + (1/\omega_n^2)s^2]$$

Here, by setting $T_1=T_r$ and rearranging the above equation, the yaw rate transfer function $G_2(s)$ with respect to the steering wheel input angle $\delta_{sw}$ is given by (combining equations 15 and 16)

$$\pounds\{r/\delta_{sw}\} = \tag{17}$$

On the other hand, since the yaw rate transfer function of a conventional front wheel steering vehicle without any yaw rate feed-back is, from Equation (1), given by $$G_2(0)=(1/n)G_1(0)$$

the following relationship can be derived from equation 16:

$$\pounds\{r/\delta_{sw}\} = \tag{17'}$$

$$G_2(s) = (1/n)G_1(O)(1 + T_r s)/[1 + (2\zeta/\omega_n)s + (1/\omega_n^2)s^2]$$

The difference between Equations (17) and (17') is found only in the s-term in the denominator, and it means that the yaw rate feed-back adds $T_d$ to the coefficient $2\zeta/\omega_n$. In other words, by performing the yaw rate feed-back given in FIG. 1 and setting the parameter $T_1=T_r$, the coefficient of the s-term or the damping term in the denominator of Equation (17), which gives the characteristic equation for the yaw rate, increases by $T_d$. The other terms of Equation (17) are identical to those of Equation (17').

In short, as shown in FIG. 1, by performing a feed-back through a wash-out filter such as the one expressed by $T_d s/(1+T_r s)$, the damping of the yaw response of the vehicle can be controlled at will without changing the natural frequency $\omega_n$ and the advance time constant $T_r$ of the yaw rate.

2. Description of Control Method II

Figure 2:
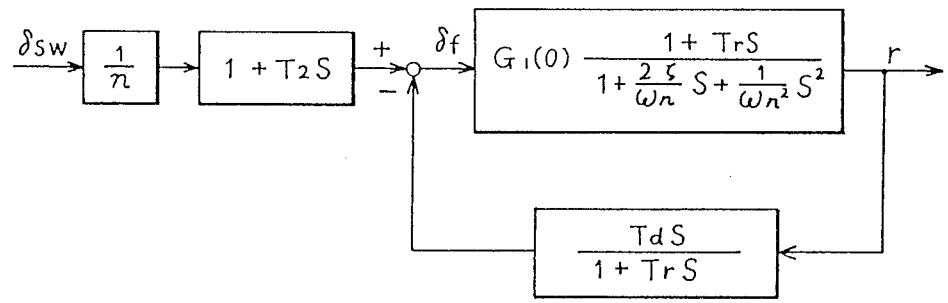

Feed-forward control which adds a derivative term based on the steering wheel angular velocity to the front wheel steer angle, in addition to the steering wheel input angle As shown in FIG. 2, the front wheel steer angle $\delta_f$ with respect to the steering wheel input angle $\delta_{sw}$ is dynamically controlled (according to the turning angle of the steering wheel and the turning speed of the steering wheel) according to the transfer function $(1+T_2s)$, instead of controlling the same simply with a fixed gear ratio $(1/n)$. The coefficient $T_2$ of the s-term is generally known as the differentiation time.

Figure 3:
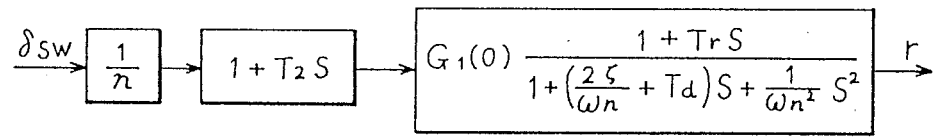

From the previous discussion, FIGS. 2 and 3 are equivalent to each other.

Figure 4:
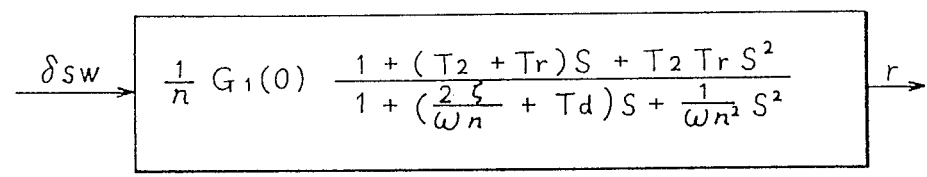

By combining the blocks arranged in series in FIG. 3 into one, FIG. 4 is obtained. In other words, the yaw rate r against the steering wheel input angle $\delta_{sw}$ is given by $$\pounds(r/\delta_{sw})=G_2(s)=(1/n)G_1(0)\times\{1+(T_2+T_r)s+T_2 T_r s^2\}/[1+\{(2\zeta/\omega_n)+T_d\}s+(1/\omega_n^2)s^2] \tag{18}$$

Here, by selecting according to the invention the time constants $T_2$ and $T_d$ such that $$T_2+T_r=(2\zeta/\omega_n)+T_d \tag{19}$$

and $$T_2T_r = 1/\omega_n^2 \quad (20)$$

Figure 5:
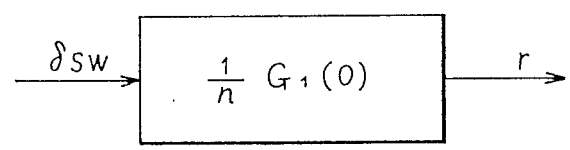

Equation (18) can be simplified into $$\mathcal{L}(r/\delta_{sw}) = G_2(s) = (1/n)G_1(0) = (1/n)V_0/l(1 + K V_0^2) \quad (21)$$

and only the proportional term remains, with the result that the transfer function given in FIG. 4 can be reduced into the one shown in FIG. 5.

The parameters $T_2$ and $T_d$ which satisfy Equations (19) and (20) can be readily found as follows:

$$T_2 = 1/T_r\omega_n^2 \quad (22)$$

$$T_d = T_r + T_2 - 2\xi/\omega_n \quad (23)$$
$$= T_r + (1/T_r\omega_n^2) - (2\xi/\omega_n)$$

By rewriting Equations (22) and (23) using Equations (4) through (6), one obtains $$T_2 = \frac{1}{G_f a l} \cdot \frac{V_0}{(1 + K V_0^2)} \quad (24)$$

$$T_d = \left\{ \frac{1}{am} - b + \frac{am}{C_r l} V_0^2 \right\} \times \frac{K V_0}{1 + K V_0^2} \quad (25)$$

In others words, $T_2$ and $T_d$ both become functions of the vehicle speed $V_O$ only. The other terms are constants which are all uniquely determined by the specifications of the vehicle.

Figure 6:
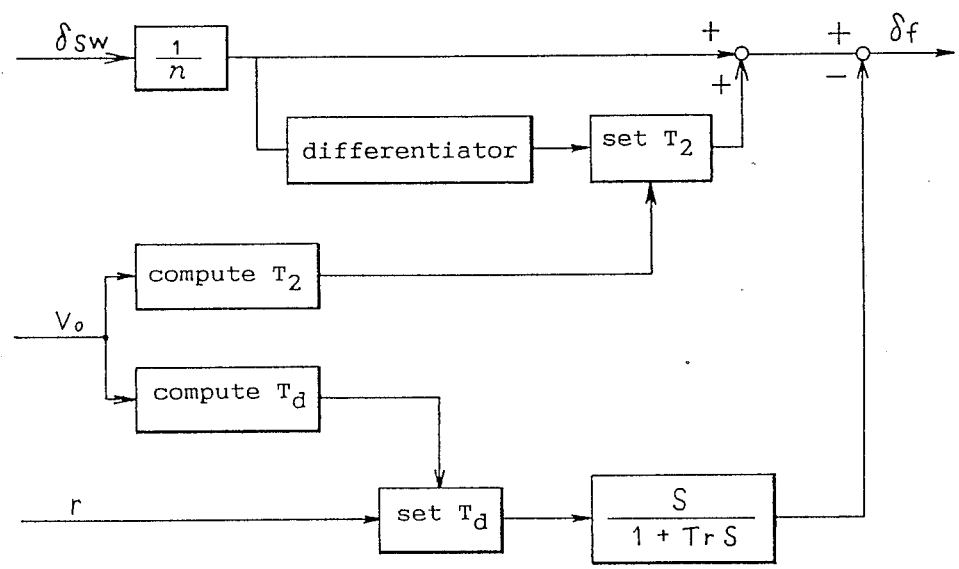

In the actual process of control, as shown in FIG. 6, the vehicle speed $V_O$ is detected and the parameters $T_2$ and $T_d$ are computed according to Equations (24) and (25). Then, the front wheel steer angle $\delta_f$ is controlled as a process of addition and subtraction with respect to the steering wheel input angle $\delta_{sw}$, according to the steering wheel input angle $\delta_{sw}$ and the yaw rate r.

According to this control method, the response of the yaw rate r becomes free from time delay with respect to the steering wheel input angle $\delta_{sw}$ and the behavior of the vehicle becomes highly predictable with the result that the driving of the vehicle is much simplified for the driver.

Figure 7:
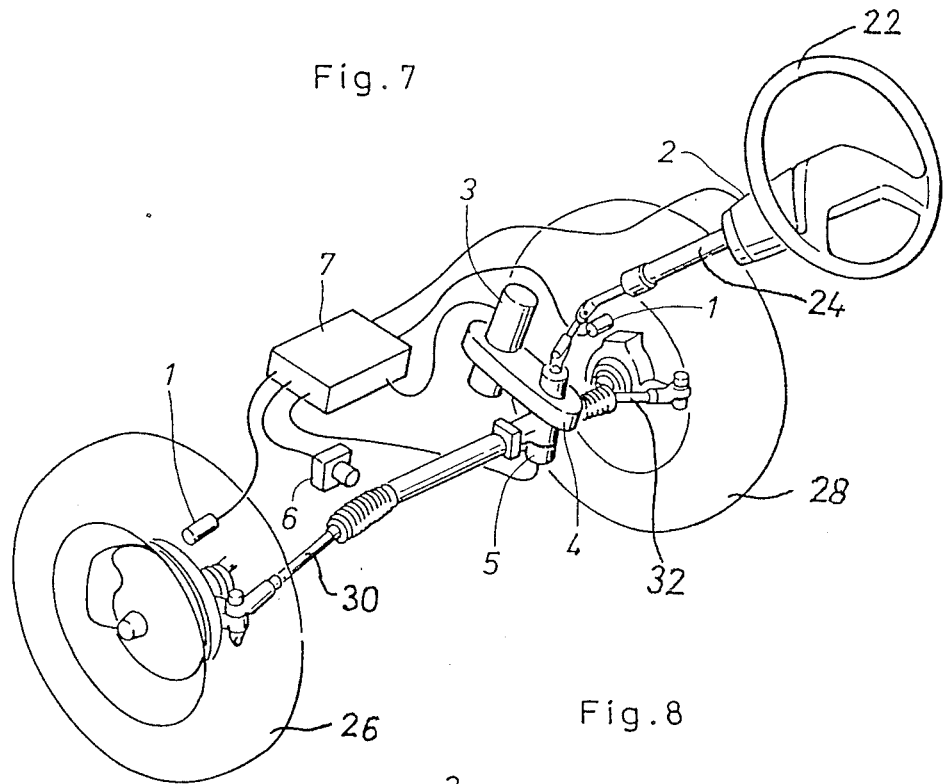
FIG. 7 is a schematic perspective view of a structure for implementing the method according to the present invention.

FIG. 7 shows a specific structure for implementing the above described method.

The information, such as the vehicle speed, the steering wheel input angle, the front wheel steer angle and so on, detected by a vehicle speed sensor 1, a steering wheel input angular speed sensor 2, a steer angle sensor 5, a yaw rate gyro 6 and so on, is supplied to a computer 6 which realizes the previously mentioned transfer function through a digital process, and performs the required steering operation by supplying to a motor 3 a certain drive signal as an addition or subtraction with respect to the steering wheel input angle. The steering angle wheel angular speed sensor 2 may conveniently consist of an angular speed sensor, such as a tacho-generator which can directly measure the angular speed, but may also consist of an angle sensor, such as a potentiometer or a rotary encoder, whose output is to be differentiated by the computer. Also shown in FIG. 7 are the other conventional elements of a steering system, including steering wheel 22, steering column 24, wheels 26, 28, and steering arms 30, 32.

Figure 8:
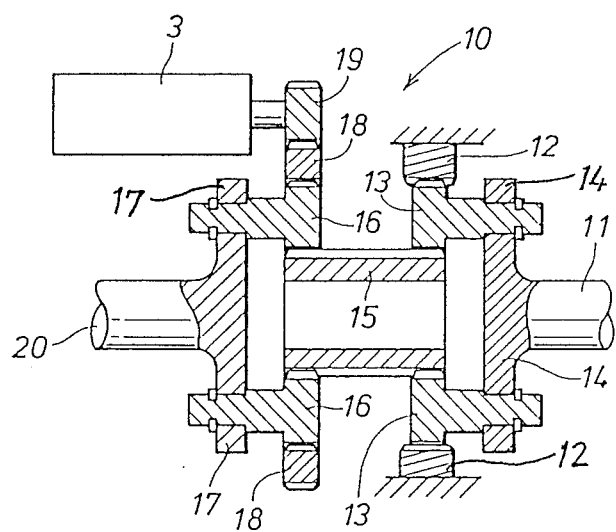
FIG. 8 is an illustrative view showing an embodiment of the addition mechanism incorporated in the steering gear box.

The addition and subtraction process for the steering wheel input angle is performed by an addition mechanism 10, as shown in FIG. 8, which is incorporated in the steering gear box 4. This addition mechanism comprises an input shaft 11 which is connected to the steering shaft, a plurality of planetary gears 13 pivotally supported by a carrier 14 which is in turn securely attached to the input shaft. The planetary gears 13 mesh with a sun gear 15 as well as with a fixed internal gear 12. A plurality of different planetary gears 16 are pivotally supported by a carrier 17 which is fixedly attached to an output shaft 20 for undergoing an angular motion proportional to the steer angle of the front wheels, and mesh with a rotatably supported internal gear 18, as well as with the common sun gear 15. The pinion gear 19 which is fixedly attached to the output shaft of the motor 3 meshes with an outer gear formed around the internal gear 18.

In this mechanism, when the motor 3 is not turning, the rotation of the input shaft 11 is transmitted to the output shaft 20 at one-to-one ratio by way of the planetary gears 13, the sun gear 15 and the planetary gears 16. On the other hand, as the motor 3 turns, the internal gear 18 turns accordingly, and the resulting rotation of the planetary gears 16 adds to the rotation of the output shaft 20.

In the above described embodiment, attention was directed to the output response of the yaw rate, but it is equally possible to direct the attention to the lateral acceleration of the vehicle as the output response.

Thus, the time delay of the response of the yaw rate r with respect to the steering wheel input angle $\delta_{sw}$ is eliminated, and the behavior of the vehicle becomes highly predictable so that a substantial advantage is obtained in reducing the burden on the driver.

What we claim is:

1. A method for controlling a front wheel steer angle $\delta_f$ of a vehicle having a front wheel steering system, comprising the steps of:
   detecting the speed of the vehicle;
   detecting a value of a yaw rate r of the vehicle;
   computing parameters $T_1$ and $T_d$ for respectively time delay and damping properties of the yaw response of the system as a function of the detected speed; and
   steering the front wheels of the vehicle at the front wheel steer angle $\delta_f$ which is computed as a sum of a steering wheel input angle feed-forward term $f_1(\delta_{sw})$ which is a function of the steering wheel input angle $\delta_{sw}$, and a yaw rate feed-back term $f_2(r)$ which is a function of the detected value of the yaw rate r, according to the formula $$\delta_f = f_1(\delta_{sw}) + f_2(r); \quad (7)$$

and based on a transfer function of the yaw rate feed-back term $f_2(r)$ with respect to the yaw rate r given by $$\mathcal{L}\{f_2(r)/r\} = \frac{T_d s}{1 + T_1 s} \quad (8)$$

where s is the Laplace variable and $\mathcal{L}\{\ \}$ denotes the Laplace transformation.

2. A method for controlling the front wheel steer angle as defined in claim 1, wherein a transfer function of the yaw rate r with respect to the front wheel steer angle $\delta_f$, or $G_1(s)$, is given by $$G_1(s) = G_1(O) \times \frac{1 + T_r s}{1 + (2\zeta/\omega_n)s + (1/\omega_n^2)s^2} \quad (1)$$

where $T_r$ is an advance time constant of the yaw rate, $\zeta$ is a damping coefficient, $\omega_n$ is the natural frequency of the yawing motion and $G_1(0)$ is the yaw rate when the vehicle is undergoing a steady turn where $$T_1 = T_r.$$

3. A method for controlling the front wheel steer angle as defined in claim 2, wherein $T_1$ and $T_d$ are both functions of the vehicle speed, and $T_1$ and $T_d$ increase as the vehicle speed increases.

4. A method for controlling the front wheel steer angle as in claim 1, 2 or 3, wherein the steering wheel input angle feed-forward term $f_1(\delta_{sw})$ is $$\mathcal{L}\{f_1(\delta_{sw})/\delta_{sw}\} = (1/n)(1 + T_2 s) \quad (11)$$

where $T_2$ is a second time delay coefficient, and n is a steering gear ratio.

5. A method for controlling the front wheel steer angle as defined in claim 4, wherein the $$T_2 = (1/\omega_n^2)(1/Tr) \quad (12)$$

and $$T_d = \{T_r + T_2 - (2\zeta/\omega_n)\} \times \{1/G_1(0)\} \quad (13)$$

6. The method of claim 1, further comprising the steps of:
   performing the step of computing in a computer;
   providing a resulting drive signal representing a correction to the steering wheel angle based on the step of computing to a motor; and
   driving a steering gear box of the vehicle by the motor so as to control the front wheel steer angle.

7. The method of claim 6, wherein the step of driving the steering gear box is performed by a geared addition mechanism.

8. A method for controlling front wheel steer angle in a vehicle having a front wheel steering system, comprising the steps of:
   detecting the speed of the vehicle;
   detecting a yaw rate of the vehicle;
   computing parameters for damping and time delay of a yaw response of the system as a function of the detected speed; and
   steering the front wheels of the vehicle at the front wheel steer angle which is computed as the sum of a steering wheel input angle feed-forward term which is a function of a steering wheel input angle, and a yaw rate feed-back term which is a function of the detected yaw rate;
   and based on a transfer function of the yaw rate feed-back term which is a function of the computed damping and time delay parameters.

9. A method as in claim 8, wherein a transfer function of the yaw rate is a function of an advance time constant of the yaw rate, a damping coefficient, a natural frequency of the yawing motion and the yaw rate when the vehicle is undergoing a steady turn, then said advance time constant of the yaw rate is equal to the time delay parameter of the yaw response of the system.

10. A method as in claim 8, wherein both the parameters for the damping and time delay of the yaw response of the system are functions of the speed of the vehicle, and said both parameters increase as the vehicle speed increases.

11. A method as in claim 8, wherein the steering wheel input angle feed-forward term is a function of a time delay coefficient and a steering gear ratio.

12. A method as in claim 8, wherein the time delay parameter is a function of a natural frequency of a yawing motion and an advance time constant of the yaw rate; and
   the damping parameter is a function of a natural frequency of the yaw rate, the advance time constant of the yaw rate, and the time delay parameter.

* * * * *